(12) United States Patent
Heuer et al.

(10) Patent No.: US 7,707,154 B2
(45) Date of Patent: Apr. 27, 2010

(54) METHOD AND DEVICES FOR ENCODING/DECODING STRUCTURED DOCUMENTS, PARTICULARLY XML DOCUMENTS

(75) Inventors: Jörg Heuer, München (DE); Andreas Hutter, München (DE); Ulrich Niedermeier, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 10/521,832

(22) PCT Filed: Jul. 7, 2003

(86) PCT No.: PCT/DE03/02274

§ 371 (c)(1),
(2), (4) Date: Apr. 5, 2005

(87) PCT Pub. No.: WO2004/017225

PCT Pub. Date: Feb. 26, 2004

(65) Prior Publication Data

US 2005/0182778 A1    Aug. 18, 2005

(30) Foreign Application Priority Data

Jul. 15, 2002 (DE) ................. 102 31 971
Oct. 18, 2002 (DE) ................. 102 48 758

(51) Int. Cl.
*G06F 7/00* (2006.01)
*G06F 17/00* (2006.01)

(52) U.S. Cl. .................................. 707/101

(58) Field of Classification Search ........... None
See application file for complete search history.

(56) References Cited

U.S. PATENT DOCUMENTS 6,330,574 B1 * 12/2001 Murashita .................. 715/513

FOREIGN PATENT DOCUMENTS

FR    2 813 743    3/2002

OTHER PUBLICATIONS

Walmsley, "Definitive XML Schema." Jan. 1, 2002, Prentice Hall, 159-160.*
Translation of FR 2813743, Seyrat et al., "Method For Compressing/Decompressing Structured Documents," Mar. 8, 2002.*
C. M. Sperberg-McQueen, "Canonical XML Form for Post-Schema-Validation Infosets: A Preliminary Reconnaissance," Apr. 21, 2002, 1-13.*

(Continued)

*Primary Examiner*—John E Breene
*Assistant Examiner*—Aleksandr Kerzhner
(74) *Attorney, Agent, or Firm*—King & Spalding L.L.P.

(57) ABSTRACT

Methods and devices are provided for encoding/decoding structured documents, particularly XML documents, wherein a bit stream or part of a bit stream is produced from a schema as a function of a metaschema with the aid of an encoding method. Under an exemplary embodiment, at least one of the following optimization processes is carried out: separation of anonymous types from element declarations and attribute declarations and encoding as own type, the type definition thereof being instantiated in the schema definition as a top level element; normalization of the syntax trees on the encoder side; replacement of the character strings of type names; and transmission of information for the inheritance tree. The decoding takes such optimization processes into account and conversely produces a schema from the bit stream.

14 Claims, 2 Drawing Sheets

OTHER PUBLICATIONS

XP-001001465, "Text of ISO/IEC FCD 15938-1 Information Technology—Multimedia Content Description Interface—Part 1 Systems", Mar. 2001.

XP-001005949—Girardot et al., "Millau: An Encoding Format for Efficient Representation and Exchange of XML Over the Web", vol. 33, No. 1-6, Jun. 2000, pp. 747-765.

Text of ISO/IEC FCD 15938-1 Information Technology—Multimedia Content Description Interface—Part 1 Systems, Mar. 2001, pp. 1-2, I-V, 6-58.

Girardot M. et al.: Millau: An Encoding Format for Efficient Representation and Exchange of XML over the Web, Computer Networks and ISDN Systems, North Holland Publishing, Amsterdam, NL Vo. 33, No. 1-6, Jun. 2000, pp. 747-765.

Internetseite:http//www.generation5.org/simple-search.shtml.

ISO/IEC 15936-6:2001 Part 6: Referenzsoftware.

A. Kaup, et al., Multimedia Messaging mit MPEG-7, Fernseh und Kino-Technik, 56, Jahrgang, Nr. 1—Feb. 2002, pp. 27-30, plus certified English Translation.

\* cited by examiner

METHOD AND DEVICES FOR ENCODING/DECODING STRUCTURED DOCUMENTS, PARTICULARLY XML DOCUMENTS

BACKGROUND OF THE INVENTION

The present invention relates to methods or devices for encoding structured documents, particularly XML documents, in which a bit stream is generated from a structured document as a function of a schema, and a method or device for decoding, in which a structured document is generated from a bit stream as a function of a schema.

In the context of the work on the MPEG-7 standard, a method for binary encoding of XML data was developed which is referred to as the BiM method in the following and which is known, for example, from the publication ISO/IEC FDIS 15938-1:2001(E), "Information Technology—Multimedia Content Description Interface—Part 1: Systems." This method uses XML schema definitions which are available at the encoder and the decoder, such as the MPEG-7 schema, in order to generate the codes for the individual data elements of the XML description. A precondition for this method is that the same schema definitions are available at least in part to the encoder and the decoder. This can be ensured, for example, if a standardized XML schema is permanently installed in the decoder. Moreover, the possibility exists of transferring the schema to the decoder separately or in addition to the actual document. The transmission of the schema from the encoder to the decoder can be carried out in textual form, where standard text compression, such as ZIP, can be applied.

The present invention is directed toward specifying methods or devices in such a way that the transmission of the schema is carried out particularly efficiently and the dataset transmitted and the computing performance at the decoder, which is needed for generating the code tables from the schema, is reduced. Moreover, the consistency of a schema which has not been transmitted in full should be ensured.

SUMMARY OF THE INVENTION

Accordingly, the present invention consists in producing a bit stream or part of a bit stream from a schema as a function of a metaschema with the aid of an encoding method, whereby at least one of the following optimization processes is carried out:

- separation of anonymous types from element declarations and attribute declarations and encoding as own type, the type definition thereof being instantiated in the schema definition as a top level element;
- normalization of the syntax trees on the encoder side;
- replacement of the character strings of type names; and
- transmission of information for the inheritance tree.

The decoding takes such optimization processes into account and conversely produces a schema from the bit stream.

Additional features and advantages of the present invention are described in, and will be apparent from, the following Detailed Description of the Invention and the Figures.

DETAILED DESCRIPTION OF THE INVENTION

Since XML schemas for their part INCLUDE XML documents based on a standardized syntax definition, specifically what is referred to as a "SCHEMA for schemas" (W3C specification), which virtually represents a metaschema, a schema also MAY be encoded and transmitted with the aid of the BiM method referred to above.

Figure 1:
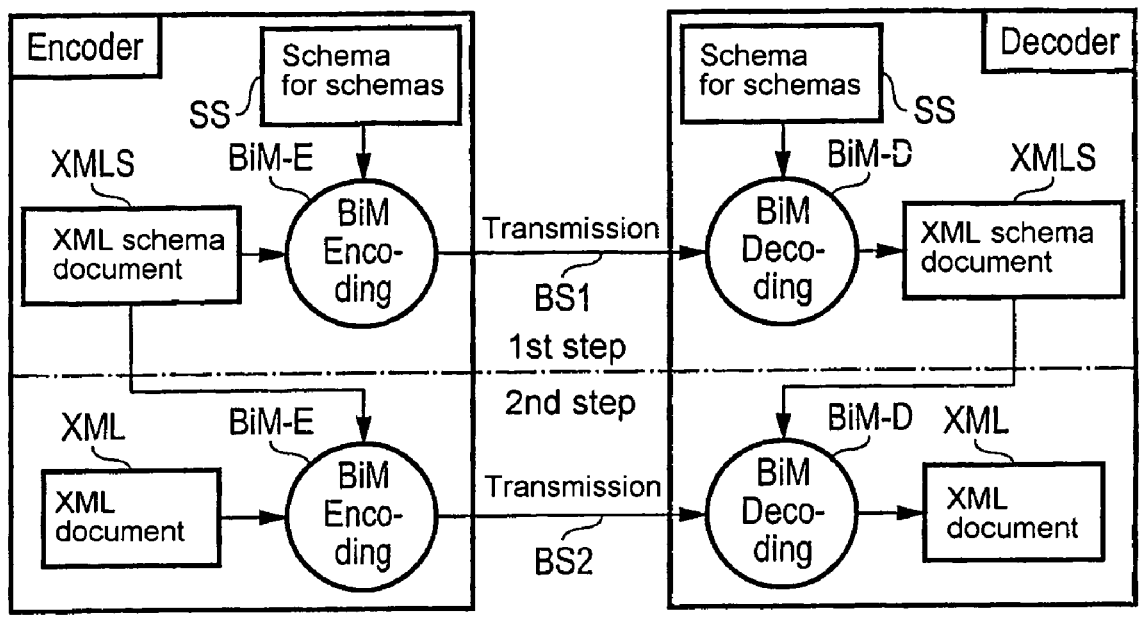
FIG. 1 shows a schematic diagram to explain the encoding/decoding according to the present invention.

FIG. 1 shows an arrangement in which, in a first step, part of a bit stream or a bit stream BS1 is produced from an XML schema XMLS as a function of a metaschema SS with the aid of a BiM encoding method BiM-E and in which, in a second step, a further part of the bit stream or a bit stream BS2 is produced from an XML document XML as a function of the schema XMLS with the aid of the same BiM encoding method BiM-E. Also, in the opposite direction an XML schema and the XML document are recovered from the two parts of the bit stream or from the bit streams BS1 and BS 2 with the aid of a BiM decoding method BiM-D.

In a first preferred embodiment of the present invention, the separation of what are referred to as "anonymous types" from the element or attribute declaration is performed.

The transmission of an XML document is effected "depth first" in the case of the BiM method, but the operation of schema compilation at the decoder demands a "breadth first" structure. In the case of groups such as sequence or choice groups, this can be compensated for by using a small memory on the decoder side. In the case of the "anonymous types," however, which can define the type of an individual element or attribute, the complexity justifies a restructuring process on the encoder side: the anonymous type definitions, designated by ATO in the following example, are taken out of the element declaration for the element "Curriculum Vitae" and given a name and/or code which is used for referencing purposes in the case of the corresponding element.

Advantageously, this reduces the depth of the hierarchy of the types transmitted, with the result that the compilation of the schema on the decoder side is simplified.

EXAMPLE

Schema prior to restructuring

```
<complexType name="PersonDescriptor">
    <element name="CurriculumVitae">
        <complexType>
            <element name="name" type="string"/>
            <element name="birthday" type="date"/>
            ...
        </complexType>
    </element>
    <element name="profession" type="profTp" />
</complexType>
```

Schema following restructuring

```
<complexType name="PersonDescriptor">
    <element name="CurriculumVitae" type="AT0"/>
    <element name="profession" type="profTp" />
</complexType>
```

-continued

```
<complexType name="AT0">
    <element name="name" type="string"/>
    <element name="birthday" type="date"/>
    ...
</complexType>
```

In a second preferred embodiment of the present invention, the normalization of the syntax trees, as specified in BiM, is carried out on the encoder side.

In the BiM method, what are referred to as "Finite State Automatons," which are used for decoding the bit stream, are produced from syntax trees which map the structure of the XML schema. In order to enhance encoding efficiency, these syntax trees do not correspond 1:1 to the textual XML definitions; instead, normalizations are performed. Three different cases can occur in this respect:

1. Simplification of a group which contains only one element:

the group is dissolved and the contained element is put into the content model at the level of the dissolved group, where the attributes minOccurs and maxOccurs of the element are replaced by the product of the corresponding attributes of the dissolved group and the element prior to the regrouping.

2. Simplification of a choice group containing an element with the attribute value minOccurs=0:

the attribute "minOccurs" of the choice group is set to 0 irrespective of the previous value, while the element which had an attribute value minOccurs=0 is assigned an attribute value minOccurs=1.

3. Simplification of nested choice groups:

if a choice group contains another choice group which contains the attribute values minOccurs=maxOccurs=1, that choice group is dissolved and the contents are incorporated directly into the superordinate choice group.

In the case of the transmission of the schema, these simplifications should already be performed at the encoder since the syntax tree transformations influence the allocation of the normative codes and the compilation of the schema is simplified on the decoder side if the content model can be taken over directly.

In this case, the advantages lie in the fact that this also relieves the burden on the decoder and the content model can be fed to the schema compiler directly as it is created in the type decoding.

Figure 2:
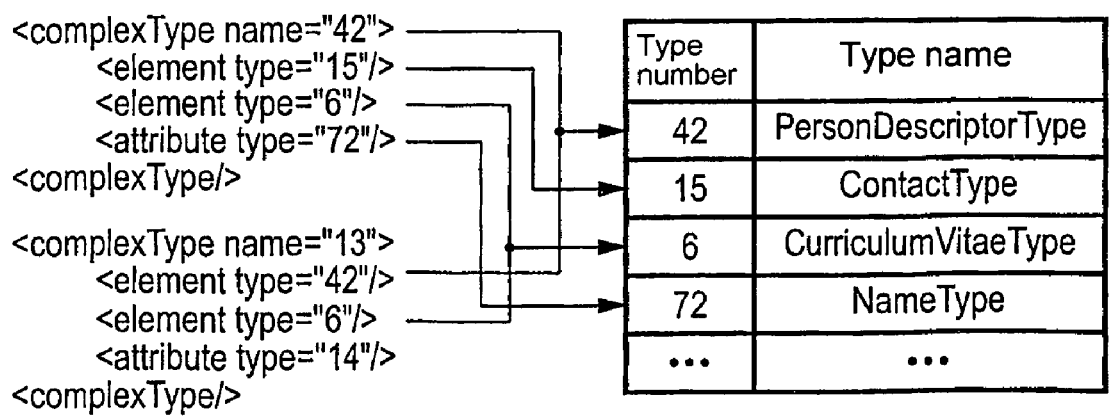
FIG. 2 shows a diagram to explain the details of a preferred embodiment of the present invention.

In a third preferred embodiment of the present invention, the replacement of the character strings of type names is carried out, as shown in FIG. 2.

In the "name" and "base" attributes of a type definition, and also in the case of the "type" attribute of an element declaration or attribute declaration, the same type names occur frequently in the schema, which would be transmitted multiple times as character strings. In the case of type name encoding, therefore, it is advantageous to encode only a number in place of the name, and separately from this a table which links the numbers back to the original names. A suitable number includes the type number, which the inheritance tree of the master type explained in further detail below allocates to all complexTypes.

The also applies to the "name" attribute of global element declarations and their references in "ref" attributes, and to the names of substitution groups in the "substitutionGroup" attribute. In these cases, the schema branch code SBC of the global elements can be used, for example.

This allows savings in data volume since a repeated reference to the same type name can be represented in more compact form and the type allocation table can be compressed better with a standard compression tool since the type names do not occur distributed throughout the bit stream, but rather in compact form in a connected area in the bit stream.

In an advantageous embodiment, a list including the type names or element names or names of substitution groups is encoded. Instead of explicitly allocating numbers to the names, the position of a name in the list is used as a number in this embodiment. This is advantageous since numbers no longer have to be encoded in the list and, therefore, more efficient transmission is ensured.

In a fourth preferred embodiment of the present invention, the transmission of information for the inheritance tree is effected.

Each type definition contains, in what is referred to as the "base" attribute, if it is present, information as to which type it has been inherited from. Collecting all this information for a schema results in a tree structure, referred to as the inheritance tree. The inheritance tree is used in the case of the BiM encoding method to transfer the new type of the element in the event of a type conversion (type-cast). In this respect, the code allocated to all types inherited from the base type, that is to say what is referred to as the type code, as well as the length of such code, is critical for correct decoding. The length is given by the overall number of all types in the inheritance tree under the base type. If the schema has been transmitted in full, both the codes and the code length can be determined unambiguously on the decoder side. If the schema is not complete on the decoder side, however, additional information still has to be transmitted in order to assign type codes to types which have already been transmitted.

Each transmitted type has the number of the type code with reference to the master type in the name field. This allows the type code of the derived types to be determined through simple difference formation. Still missing is the information about the power of the sub-tree defined by the transmitted types and, therefore, the length of the type codes of the types derived from these transmitted types. This length can be transmitted with the aid of a few bits in a variable length code.

Figure 3:
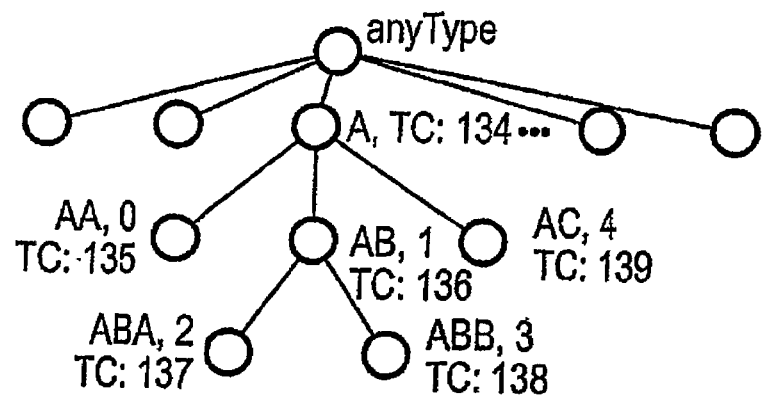
FIG. 3 shows a diagram to explain the details of a further preferred embodiment of the present invention.

FIG. 3 shows an inheritance tree of a schema with the type A, from which further types are derived, by way of example. This type is given the type code 134, for example, with reference to the master type "andType." Derived from type A are the types AA, AB and AC, the type codes of which are specified with reference to the master type. In order to determine the type code with reference to the base type A, it is sufficient to subtract the type code of the base type and one from the type code of the desired type:

$$TC_{type} = TC_{type\ with\ ref.\ to\ master\ type} - TC_{base\ type\ with\ ref\ to\ master\ type} - 1$$

The missing information about the length of the type code can be integrated best in the reference table as an additional number.

In order to be able to compress the information in the type allocation table with a standard compression tool, it is advisable to store it aligned to whole bytes (byte-aligned). The first number includes a vluimsbf5 number which encodes the number of lines in the table, followed by a vluimsbf5 number which encodes the number of bits for the type code, and a further vluimsbf5 number which represents the type code with reference to the master type itself. Filler bits or stuffing bits follow in order to achieve the alignment to byte boundaries.

| Format of the type allocation table | | | |
|---|---|---|---|
| Vuimsbf5 | Vuimsbf5 | Bits | Character string |
| Number of lines | | | |
| Length of type code 1 | Type code 1 | 0-7 filler bits | Name of type 1 |
| Length of type code 2 | Type code 2 | 0-7 filler bits | Name of type 2 |
| . | . | . | . |
| . | . | . | . |
| . | . | . | . |

The transmission of a type allocation table makes it possible to correctly decode any type codes present in an encoded document even if the underlying schema has not, or not yet, been transmitted and/or decoded in full.

Correspondingly, the global SBC must be transferred with global elements, and the substitution code in the case of elements belonging to a substitution group, where one global SBC length and, with the header element of the substitution group, the length of the respective substitution code are transferred in advance for all global elements.

Any combination of the features represented in the individual embodiments is possible in the encoding and may be used in corresponding fashion in the decoding.

The BiM method requires that the XML schema is compiled in a format which permits the stipulation of the length of the code words and the choice of the data elements by the values of the codes. There are several possibilities for this. The MPEG-7 standard (ISO/IEC 15938-1:2001 Part 1: Systems or ISO/IEC 15938-6:2001 Part 6: Reference software) proposes a model which uses finite state automatons for the decoding of the useful information or payload, and code tables which are generated from the schema for the decoding of a context path.

Figure 4:
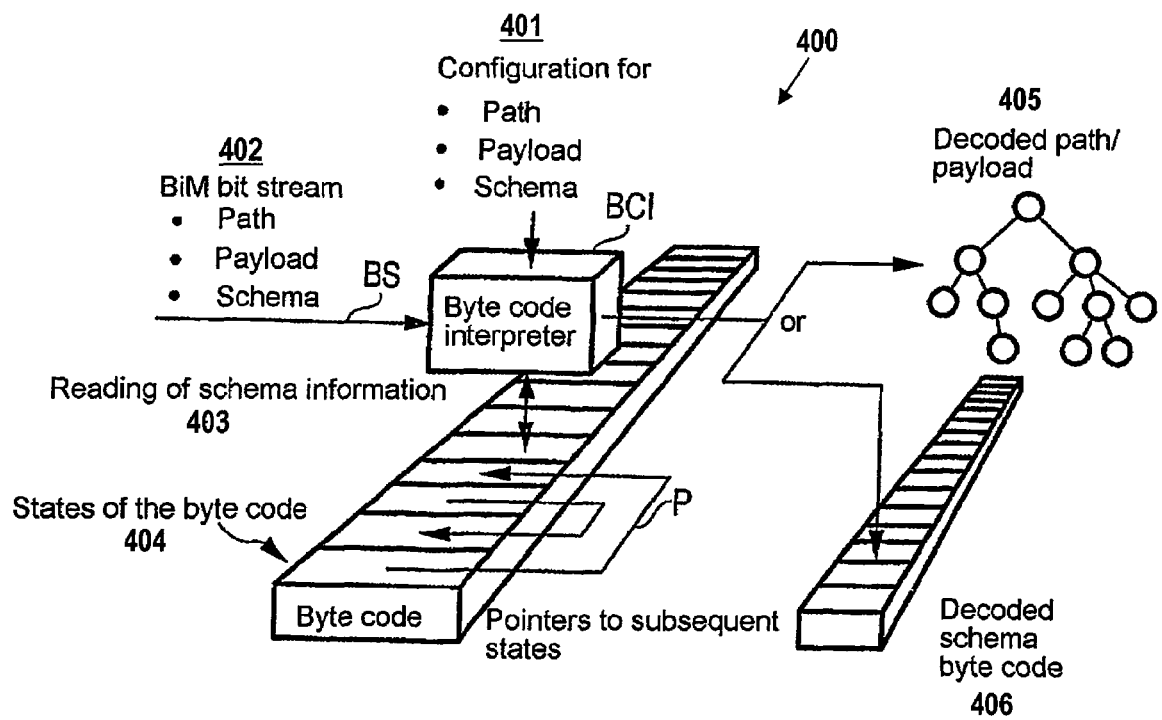
FIG. 4 shows a schematic diagram of a preferred embodiment of a decoder according to the present invention.

In a preferred embodiment of the decoder according to the present invention shown in FIG. 4, the decoding operation 400 is described with the aid of a byte code model, where the schema structure 401 is translated into a system of interlinked states which are processed by a byte code interpreter BCI, where a bit stream BS received from the encoder contains the information 402 about the subsequent state to be chosen. In contrast to the model proposed in the MPEG-7 standard, the byte code model is created in such a way that both a bit stream representing a payload as well as a bit stream representing a context path can be decoded. There is, therefore, no requirement to hold the same information contained in the schema twice at the decoder for the different encoding methods. The BCI interpreter reads the information from the incoming bit stream which encodes an XML document or an XML schema in the BiM format. This information allows a choice from among the subsequent states 404 of the current state which is stored in the byte code. The subsequent states are created permanently as pointers P within the byte code. A path, payload or byte code is output (405, 406) depending on the configuration.

The decoding of a schema also may be implemented efficiently in the byte code model with the aid of the modifications proposed above. In this case, no payload or path is output; instead, a byte code is produced directly which can be used by the byte code interpreter for the decoding of the corresponding types.

The byte code is made up of structural elements or the states 404. The states are of different types, identified with the aid of the header bit field of the state. The states contain different information fields depending on the type, which are read and, depending on the configuration (payload/context path) and current state, analyzed by the byte code interpreter.

Several variants are possible for the types of states which represent the schema information. An important factor is that all the syntax elements of an XML schema can be reproduced by the states of the byte code model, and that all the information necessary for efficient decoding of the two algorithms defined in the MPEG-7 standard (context path/payload) is made available in the states.

A possible structure of the byte code is outlined briefly in the following.

Types of State: Overview

1. Header State of a complexType

The header state of a type forms the starting point in the decoding of a complexType. It contains the name of the type (if it does not constitute an anonymous type), information concerning inheritance of the type (pointer to base state) and polymorphism.

A specific factor for payload encoding includes a pointer to a list of the attributes of the type. A specific factor for context path encoding includes fields with the number of child elements for the context and operand tree branch code tables.

The last information field includes a pointer to the subsequent state; i.e., the first state which represents the content of the complexType (an element state or a choice state, for example).

Graphical representation of a header state:

| |
|---|
| Header bit field |
| Pointer to string with name |
| Pointer to header state for base type |
| Pointer to inheritance tree |
| Number of children for context TBC |
| Number of children for operand TBC |
| Pointer to subsequent state |

2. Choice State

A choice state reproduces a choice group of the XML schema. The choice state basically contains a list of pointers with possible subsequent states. In order to stipulate the state actually chosen, the bit stream has to be read during the decoding of a payload. There are two variants of the choice state: a start state which branches into the different possible subsequent states, and an end state which summarizes the choice again.

3. Element State

The element state reproduces an element declaration in a complexType of a schema. It contains a pointer to a character string with the name of the element, and a pointer to the header state of the type. Furthermore, information may be present about the length of the position code (for path decoding only) and for substitution groups.

4. Attribute State

An attribute state reproduces an attribute declaration of a schema. It contains a pointer to the name of the attribute, and a pointer to the header state of the simpleType of the attribute.

5. Occurrence State

An occurrence state reproduces the minOccurs and maxOccurs attributes which can occur in the case of an XML schema; e.g., in the case of an element or a group (choice, sequence, etc.). It contains a pointer to the subsequent state if a further instance of the element or group occurs, and a pointer to the subsequent state if the last instance of the group has been encoded. Since the possibility exists of an element containing itself in the case of XML schemas (the element itself occurs again in the complexType definition of the element, or in an even deeper nesting), an occurrence state also may be active more than once at the same time. A pointer to a stack within the occurrence state is therefore required which secures the current state of each active instance of the occurrence state.

6. End State of a Type

The end state of a type contains a list of pointers with all the attributes of that type. It is required in the decoding of a path since all the attributes are put in at the end of the table in the tree branch code table. Upon reaching an end state, the byte code interpreter branches hierarchically into the element which has called that type. The corresponding information about the calling element has to be stored in the working memory of the byte code interpreter.

7. Header State of a simpleType

This state controls the decoding of content; i.e., it contains a pointer to a codec which can specifically read and decode data of the relevant type from the bit stream. The type of the codec is specified in an information field.

Advantages of the byte code model compared to the status of the MPEG-7 reference software include:

1. The schema information is represented only once at the decoder for both encoding methods (context path/payload). The major part of the information in the byte code states is relevant for both methods. A smaller part is specific for one of the two methods in each case. The representation of the schema information at the decoder is therefore very compact.

2. The byte code model makes a well-defined data format available for schema information which is also suitable for precompiling and saving; for example, in place of the XML schema as text.

3. The execution of the byte code by a standard processor can be carried out rapidly since the byte code model prepares the decoding operation very effectively. All the information is available directly in the state via pointers and does not need to be partly searched for in lists first (as in ISO/IEC 15938-6, Part 6: Reference software).

A corresponding encoder may be implemented in the same manner, where it is inverted in the manner that the states are controlled by the textual representation of the structured document and the state transitions generate the binary representation.

Although the present invention has been described with reference to specific embodiments, those of skill in the art will recognize that changes may be made thereto without departing from the spirit and scope of the present invention as set forth in the hereafter appended claims.

The invention claimed is:

1. A method for encoding transmitting an Extensible Markup Language (XML) document, wherein an XML schema is associated with the XML document, the method comprising:

a) generating a normalized XML schema, wherein the normalization of the XML schema comprises one of:

simplifying a group which contains only one element, the group being dissolved and the one element being put into a content model at a level of the dissolved group, with attributes minOccurs and maxOccurs of the element being replaced by a product of corresponding attributes of the dissolved group and the one element prior to regrouping;

simplifying a choice group containing an element with an attribute value minOccurs=0, the attribute minOccurs of the choice group being set to 0 irrespective of a previous value, with the element having the attribute value minOccurs=0 being assigned an attribute value minOccurs=1; and simplifying nested choice groups, wherein if a choice group contains a further choice group containing attribute values minOccurs=maxOccurs=1, the further choice group is dissolved and contents of the further choice group are incorporated directly into the choice group;

b) encoding the normalized XML schema to an encoded XML schema using a metaschema using the BiM method;

c) transmitting the encoded XML schema in a first bit stream;

d) generating an encoded XML document by encoding the XML document to an encoded XML document using the normalized XML schema using the BiM method; and e) transmitting the encoded XML document in a second bit stream, wherein the first and second bit streams are provided for reception for a decoder.

2. A method for encoding and transmitting an XML document as claimed in claim 1, further comprising restructuring at least one of element declarations and attributes declarations of a schema definition of a structured document such that anonymous type definitions are taken out of the respective at least one of element declarations and attribute declarations and are given at least one of a name and a code which is used for referencing purposes for the corresponding element.

3. A method for encoding and transmitting an XML document as claimed in claim 1, wherein, in place of at least one of type names, element names and names of substitution groups, only numbers and at least one table containing an allocation between numbers and the respective at least one of type names, element names and names of substitution groups are encoded.

4. A method for encoding and transmitting an XML document as claimed in claim 1, wherein at least one list comprising at least one of types names, element names, and names of substitution groups, as well as positions of the respective type names, element names and names of substitution groups in the list, are encoded in place of the respective type names, element names and names of substitution groups.

5. A method for encoding and transmitting an XML document as claimed in claim 1, wherein information for at least one of an inheritance tree of types, global elements and substitution groups is encoded, and wherein at least one of:

(i) each type is described by both an item of information about a respective type code with reference to a master type and a length of all type codes which refer to the type described, (ii) each global element is described by both a length of a respective schema branch code (SBC) and the respective SBC, and (iii) each element in a substitution group is described by both a length of a respective substitution code and the respective substitution code.

6. A method for encoding, transmitting and decoding an Extensible Markup Language (XML) document, wherein an XML schema is associated with the XML document, the method comprising:

a) generating a normalized XML schema, wherein the normalization of the XML schema comprises one of:

simplifying a group which contains only one element, the group being dissolved and the one element being put into a content model at a level of the dissolved group, with attributes minOccurs and maxOccurs of the element being replaced by a product of corresponding attributes of the dissolved group and the one element prior to regrouping;

simplifying a choice group containing an element with an attribute value minOccurs=0, the attribute minOccurs of the choice group being set to 0 irrespective of a previous value, with the element having the attribute value minOccurs=0 being assigned an attribute value minOccurs=1; and simplifying nested choice groups, wherein if a choice group contains a further choice group containing attribute values minOccurs=maxOccurs=1, the further choice group is dissolved and contents of the further choice group are incorporated directly into the choice group;

b) encoding the normalized XML schema to an encoded XML schema using a metaschema using the BiM method;

c) transmitting the encoded XML schema in a first bit stream;

d) generating an encoded XML document by encoding the XML document to an encoded XML document using the normalized XML schema using the BiM method;

e) transmitting the encoded XML document in a second bit stream, wherein the first and second bit streams are provided for reception for a decoder;

f) decoding the encoded XML schema transmitted in the first bit stream into the normalized XML schema by using the metaschema, wherein the normalized schema and the metaschema corresponds to the shemas used in the encoding; and g) decoding the encoded XML document transmitted in the second bit stream by using the normalized XML schema, without performing a further normalization of the normalized XML schema.

7. A method for encoding, transmitting and decoding an XML document as claimed in claim 6, further comprising restructuring at least one of element declarations and attribute declarations of a structured document such that anonymous types, to each of which at least one of a name and a code has been assigned for purposes of transmission, are inserted in the respective at least one of element declarations and attribute declarations by which the respective anonymous type is referenced.

8. A method for encoding, transmitting and decoding an XML document as claimed in claim 6, wherein at least one of type names, element names and names of substitution groups are decoded via numbers and at least one table containing an allocation between numbers and the respective at least one of type names, element names and names of substitution groups.

9. A method for encoding, transmitting and decoding an XML document as claimed in claim 6, wherein at least one of type names, element names and names of substitution groups are decoded via at least one list comprising the respective at least one of type names, element names and names of substitution groups and positions of the respective at least one of type names, element names and names of substitution groups in the list.

10. A method for encoding, transmitting and decoding an XML document as claimed in claim 6, wherein information for at least one of an inheritance tree of types, global elements and substitution groups is first decoded, and wherein at least one of (i) each type is described by both an item of information about a respective type code with reference to a master type and a length of all type codes which refer to the type described, (ii) each global element is described by both a length of a respective schema branch code (SBC) and the respective SBC, and (iii) each element in a substitution group is described by both a length of a respective substitution code and the respective substitution code.

11. A method for encoding an Extensible Markup Language (XML) document, wherein an XML schema is associated with the XML document, the device being operable to perform the functionality of an encoder, wherein the encoder is operable to a) generating a normalized XML schema, wherein the normalization of the XML schema comprises one of:

simplifying a group which contains only one element, the group being dissolved and the one element being put into a content model at a level of the dissolved group, with attributes minOccurs and maxOccurs of the element being replaced by a product of corresponding attributes of the dissolved group and the one element prior to regrouping;

simplifying a choice group containing an element with an attribute value minOccurs=0, the attribute minOccurs of the choice group being set to 0 irrespective of a previous value, with the element having the attribute value minOccurs=0 being assigned an attribute value minOccurs=1; and simplifying nested choice groups, wherein if a choice group contains a further choice group containing attribute values minOccurs=maxOccurs=1, the further choice group is dissolved and contents of the further choice group are incorporated directly into the choice group;

b) encoding the normalized XML schema to an encoded XML schema using a metaschema using the BiM method, wherein the encoded XML schema is transmitted in a first bit stream; and c) generating an encoded XML document by encoding the XML document using the normalized XML schema wherein the encoded XML document is to be transmitted in a second bit stream, with the first and second bit stream being provided for reception for a decoder.

12. A device for encoding XML documents as claimed in claim 11, wherein the encoder unit covers a configurable byte code interpreter which interprets information in a byte code and which, depending on a configuration, produces a code from the structured document based on a byte code which represents one of a path and a payload.

13. A system for encoding and decoding an Extensible Markup Language (XML) document, the system being operable to perform the functionality of an encoder and a decoder, wherein the encoder is operable to:

a) generating a normalized XML schema, associated with the XML document, the normanization of the XML schema comprising one of:

simplifying a group which contains only one element, the group being dissolved and the one element being put into a content model at a level of the dissolved group, with attributes minOccurs and maxOccurs of the element being replaced by a product of corresponding attributes of the dissolved group and the one element prior to regrouping;

simplifying a choice group containing an element with an attribute value minOccurs=0, the attribute minOccurs of the choice group being set to 0 irrespective of a previous value, with the element having the attribute value minOccurs=0 being assigned an attribute value minOccurs=1; and simplifying nested choice groups, wherein if a choice group contains a further choice group containing attribute values minOccurs=maxOccurs=1, the further choice group is dissolved and contents of the further choice group are incorporated directly into the choice group;

b) encoding the normalized XML schema to an encoded XML schema using a metaschema using the BiM method; wherein the encoded XML schema is to be transmitted in a first bit stream; and c) generating an encoded XML document by encoding the XML document using the normalized XML schema wherein the encoded XML document is to be transmitted in a second bit stream, with the first and second bit stream being provided for reception for a decoder; and wherein the decoder is operable to:

d) decoding the encoded XML schema transmitted in the first bit stream into the normalized XML schema by using the metaschema, wherein the normalized schema and the metaschema corresponds to the schemas used in the encoding; and e) decoding the encoded XML document transmitted in the second bit stream by using the normalized XML schema, without performing a further normalization of the normalized XML schema.

14. A system for encoding and decoding XML documents as claimed in claim 13, wherein the decoder unit covers a configurable byte code interpreter which is configurable via information from the byte stream and which, depending on a configuration, produces at least one of a path, a payload and a byte code from the byte stream based on a byte code.

* * * * *